(12) United States Patent
Steele et al.

(10) Patent No.: US 7,884,557 B2
(45) Date of Patent: Feb. 8, 2011

(54) PROTECTION CIRCUIT AND METHOD

(75) Inventors: Colin Steele, Edinburgh (GB); Catherine A. Hearne, Kilkenny (IE); David P. Singleton, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 790 days.

(21) Appl. No.: 11/822,831

(22) Filed: Jul. 10, 2007

(65) Prior Publication Data
US 2008/0012508 A1 Jan. 17, 2008

(30) Foreign Application Priority Data
Jul. 14, 2006 (GB) ................... 0614096.6
Dec. 21, 2006 (GB) ................... 0625573.1

(51) Int. Cl.
*G05F 1/00* (2006.01)
(52) U.S. Cl. .................. 315/306; 315/312; 315/315; 315/291; 315/169.3; 363/56.03; 363/56.1; 361/55; 361/57
(58) Field of Classification Search .............. 315/306, 315/310, 312, 313, 315, 291, 169.3, 164, 315/165; 363/50, 56.03, 56.05, 56.1, 56.12, 363/21.1; 361/55–57; 340/815.4, 815.45
See application file for complete search history.

(56) References Cited

U.S. PATENT DOCUMENTS

| 5,736,881 | A | 4/1998 | Ortiz | |
|---|---|---|---|---|
| 6,239,716 | B1 * | 5/2001 | Pross et al. | 340/815.4 |
| 6,265,832 | B1 * | 7/2001 | Maisel et al. | 315/164 |
| 6,621,235 | B2 * | 9/2003 | Chang | 315/216 |
| 6,873,111 | B2 * | 3/2005 | Ito et al. | 315/82 |
| 7,274,151 | B2 * | 9/2007 | Wakou et al. | 315/169.3 |
| 7,301,447 | B2 * | 11/2007 | Patel | 340/475 |
| 2004/0135522 | A1 | 7/2004 | Berman et al. | |
| 2005/0029527 | A1 | 2/2005 | Yamamoto et al. | |
| 2005/0073489 | A1 | 4/2005 | Suzunaga et al. | |
| 2005/0243022 | A1 | 11/2005 | Negru | |
| 2006/0232394 | A1 | 10/2006 | Patel | |
| 2008/0048567 | A1 * | 2/2008 | Steele et al. | 315/151 |

FOREIGN PATENT DOCUMENTS

| DE | 102004007278 A1 | 10/2004 |
|---|---|---|
| DE | 102005008100 A1 | 8/2006 |
| GB | 1437874 A | 6/1976 |
| GB | 2 278 717 A1 | 12/1994 |

\* cited by examiner

*Primary Examiner*—Haissa Philogene
(74) *Attorney, Agent, or Firm*—Dickstein Shapiro LLP

(57) ABSTRACT

A light source is protected by selectively coupling a shunt path in parallel with the light source, such that current is diverted away from the light source and through the shunt path. A detection circuit detects the current flowing in the shunt path when the shunt path is connected in parallel with the light source. A comparator determines whether the current flowing in the shunt path exceeds a predetermined threshold and, if so, prevents or limits the flow of current when the shunt path is disconnected from being in parallel with the light source. In this way, a current detector is provided for monitoring the flow of current in a shunt path, the current detector being configured to disable or limit the flow of current through a light source when a predetermined threshold is reached. This aspect of the invention has the advantage of enabling the current flowing through a light source to be controlled by monitoring the current in the shunt path rather than the path having the light source, thus enabling the maximum current to be controlled without potentially damaging the light source.

27 Claims, 13 Drawing Sheets

PROTECTION CIRCUIT AND METHOD

TECHNICAL FIELD

The present invention relates to a protection circuit and method, and in particular, but not exclusively, to a protection circuit and method for protecting a light source, for example an LED illuminated in a RGB (Red, Blue, Green) LED array used for illuminating a target object, light from the target object being detected by a sensor, for example a CIS/CCD imaging sensor, as used in imaging apparatus such as optical imagers, e.g. scanners, and the like.

BACKGROUND

FIG. 1 shows a basic diagram of a state of the art LED driver circuit that is used, for example, in an image reading apparatus in conjunction with a CIS or CCD image sensor device. An LED array L1-L3 is coupled to switches S1-S3 and resistors R1-R3. The LED array L1-L3, switching circuit S1-S3, and resistors R1-R3 are arranged separately from the analogue front end (AFE) circuitry that is used to process image data received from the sensor device, such as a Photo Diode Array (PDA) for example.

In a colour image scanner, the LED array typically comprises Red (L1), Green (L2) and Blue (L3) LEDs. Light of each colour emitted from the respective LED illuminates a portion of a target object that is to be scanned, and the light reflected by the object is incident on a sensor device. Typically, the sensor device comprises an array of sensors arranged linearly as a line image sensor, each element of the sensor array comprising a photoelectric conversion element, such as a photodiode and a capacitor for each pixel, which converts incident light into a current which is accumulated as a charge on the capacitor. The respective charges accumulated on the respective capacitors are converted into respective voltages that are then output from the sensor array (PDA).

The voltages output from the PDA are converted by an Analogue to Digital Converter (ADC) into digital signals for subsequent processing during generation of the image of the target object being scanned.

The scanning of an image is usually performed using a line scanning operation. For colour images, each line is scanned by the Red, Green and Blue light sources. That is, the Red LED L1 is turned on to read one line in a scanning direction, thereby obtaining the Red component of that line. The Green LED L2 is then turned on to obtain the Green component of that line, followed by the Blue LED L3 being turned on to obtain the Blue component of that line. The LED array and sensor array are then typically moved on a carriage mechanism to align with the next line on the target object. Each LED L1-L3 is turned on by switching on the respective switch S1-S3, using respective switch control signals CS1-CS3 received from a switch controller logic circuit SC.

While one line is being scanned, image data received from the sensor array (PDA) relating to a previous line scan is read out serially and processed by the ADC.

The current flowing through each LED is defined by the current-voltage characteristics of the LED, by the resistance of the series resistor and by the voltage applied from the power supply, PSU, (the on-resistance of the switch usually being negligible).

FIGS. 2a-2d show the switch control signals CS1-CS3 and the supply current IS drawn from the power supply PSU in a "constant current" mode. The ground current is substantially equal to the supply current.

In addition to each LED passing a respective constant current during illumination of the target object, it is also known to use Pulse Width Modulation (PWM) control signals for controlling the illumination of each LED, such that the illumination or intensity of the LED can be controlled by controlling the duty-cycle and/or frequency of the PWM control signals. The current though the LED may be subject to wide variation due to tolerances of the power supply voltage and the (temperature-dependent) I-V characteristic of the LEDs.

FIGS. 2e-2h show the switch control signals CS1-CS3 and the supply current IS drawn from the power supply in such a PWM mode.

It will be appreciated that, in both the constant current and PWM modes of operation, the quality of the image data received from the PDA 3 is related to the intensity at which each LED L1-L3 is illuminated during respective scan periods. In addition, it is noted that the brighter the LED is illuminated, the less the sampling (i.e. integration), and hence scanning, time is required which means that the scanner can operate quicker. Therefore, it is desirable to operate the LEDs at or near their maximum current ratings without damaging the LEDs.

According to one known system, the illumination of an LED L1-L3 is controlled by passing a predetermined current through the LED, the predetermined current being chosen according to known characteristics of the LED, power supply or switch resistance. However, due to the above mentioned variations caused by tolerances of the power supply voltage and the (temperature-dependent) I-V characteristic of the LEDs, setting a predetermined maximum current in this way does not enable an LED to be illuminated at its absolute maximum intensity, since some degree of safety margin must be incorporated to allow for such tolerances. If this safety margin in made small (i.e. in order to obtain the maximum possible current), then the possibility of damaging an LED is increased, i.e. due to an over-current being passed through the LED.

It is also known to illuminate an LED L1-L3 by directly monitoring the amount of current flowing through the LED, and adjusting the current flow accordingly such that it operates near its maximum intensity. This involves monitoring the actual current flowing through LED. Operating an LED near its maximum intensity in this way can also result in the LED being damaged by an over-current, particularly when switching from one LED to another. In other words, when switching from one LED to another, if the initial current exceeds the maximum rating of the LED, then the LED will be damaged before the current monitor can detect and adjust the current flow.

It is therefore an aim of the present invention to provide a protection circuit and method for protecting a light source such as an LED, without having the disadvantages mentioned above.

SUMMARY OF THE INVENTION

According to a first aspect of the invention, there is provided a protection circuit for protecting a light source. The protection circuit comprises: a shunt path, the shunt path being selectively coupled in parallel with the light source; a detection circuit provided in the shunt path for determining the amount of current that will flow in the light source, prior to the light source being illuminated by a power supply; and a comparator for preventing or limiting the flow of current through the light source when the detection circuit determines that the amount of current will exceed a predetermined threshold.

Thus, according to the invention, a current detector is provided for monitoring the flow of current in a shunt path, the current detector being configured to disable or limit the flow of current through a light source when a predetermined threshold is reached. This aspect of the invention has the advantage of enabling the current flowing through a light source to be controlled by monitoring the current in the shunt path rather than the path having the light source, thus enabling the maximum current to be controlled without potentially damaging the light source.

According to another aspect of the present invention, there is provided a method of protecting a light source from overcurrent. The method comprises the steps of: selectively coupling a shunt path in parallel with the light source, such that current is diverted away from the light source and through the shunt path; detecting the amount of current flowing in the shunt path; and determining whether the amount of current flowing in the shunt path exceeds a predetermined threshold and, if so, preventing or limiting the flow of current in the light source when the shunt path is disconnected from being in parallel with the light source.

BRIEF DESCRIPTION OF THE DRAWINGS

For a better understanding of the invention, and to show more clearly how it may be carried into effect, reference will now be made, by way of example only, to the following drawings in which:

FIG. 11b shows a further optional improvement to FIG. 11a;

DESCRIPTION OF THE PREFERRED EMBODIMENTS

In the following description of the preferred embodiments, reference is made to protecting a light source, the light source described in the context of an LED array comprising three LEDs, i.e. Red, Green and Blue. However, it will be appreciated that the invention is equally applicable to an LED array comprising two or more LEDs, or indeed any light source, including a single light source. Furthermore, any reference to LED is intended to cover any form of light source, not only visible light but non-visible light such as Ultra Violet (UV) and Infra Red (IR). Therefore, references to an LED or LED array in the preferred embodiments are intended to cover a light source or light source array more generally.

Prior to describing the protection circuit in detail with reference to FIGS. 12b to 12d, a description will first be given of the various arrangements for driving an LED array as illustrated in FIGS. 3 to 11, corresponding to the subject matter claimed in co-pending application Ser. No. 11/822,830 by the present applicant.

Figure 3:
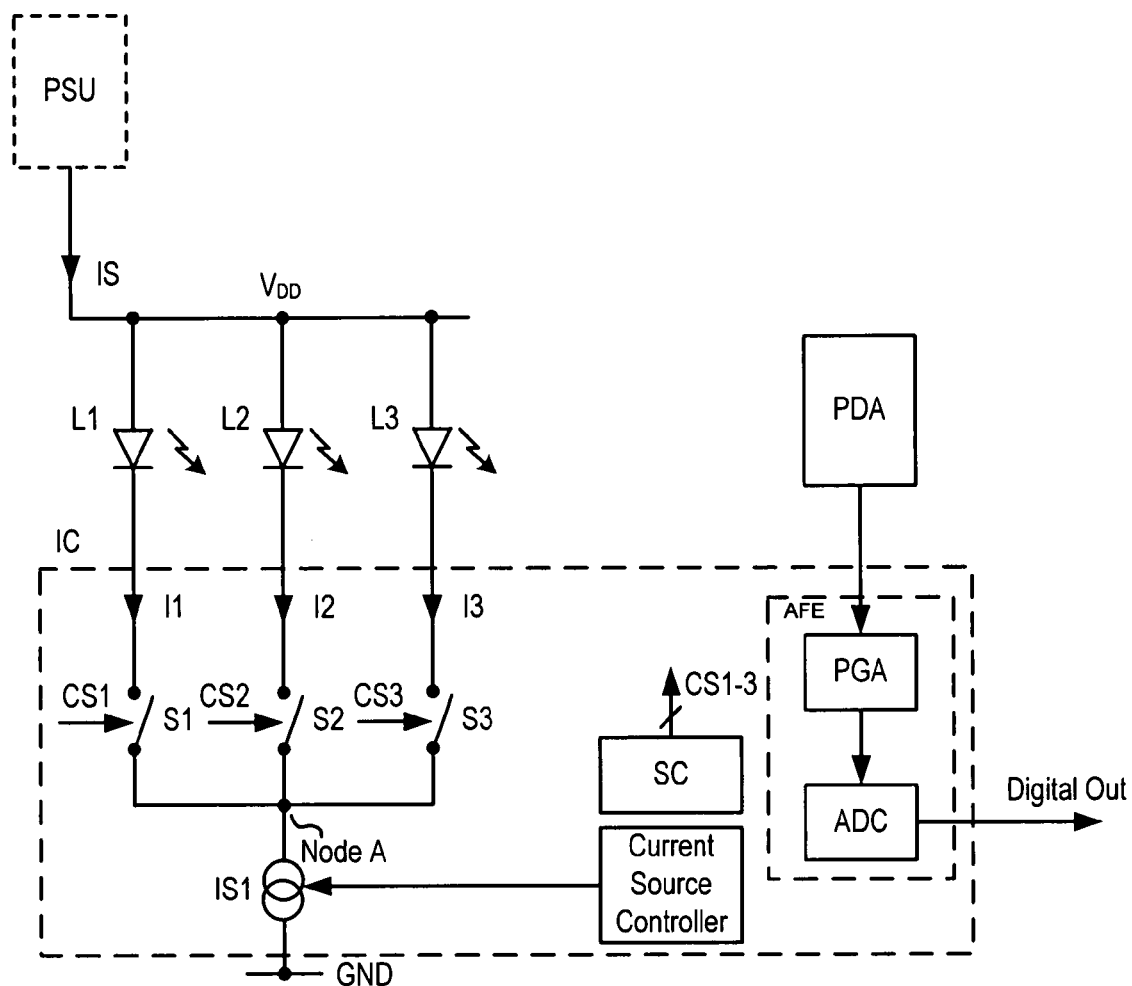
FIG. 3 shows a basic block conceptual diagram of a driver apparatus for driving an LED array, as described in co-pending application Ser. No. 11/822,830 by the same applicant.

FIG. 3 illustrates a basic block conceptual diagram of an arrangement for driving an LED array. The LED array comprises Red, Green and Blue LEDs L1, L2, L3. The LED switching circuitry S1, S2, S3 is placed on the same monolithic structure, i.e. integrated circuit, as the analogue front end circuitry (AFE), i.e. the analogue processing circuitry that processes the image data received from a sensor device. To reduce the problems associated with LED switching transients interfering with the ADC process, a current source IS1 is provided in the current path, preferably between the switches S1, S2, S3 and ground. The current source IS1 controls the flow of current through the LEDs L1, L2, or L3 according to the states of switches S1, S2, S3.

Figure 1:
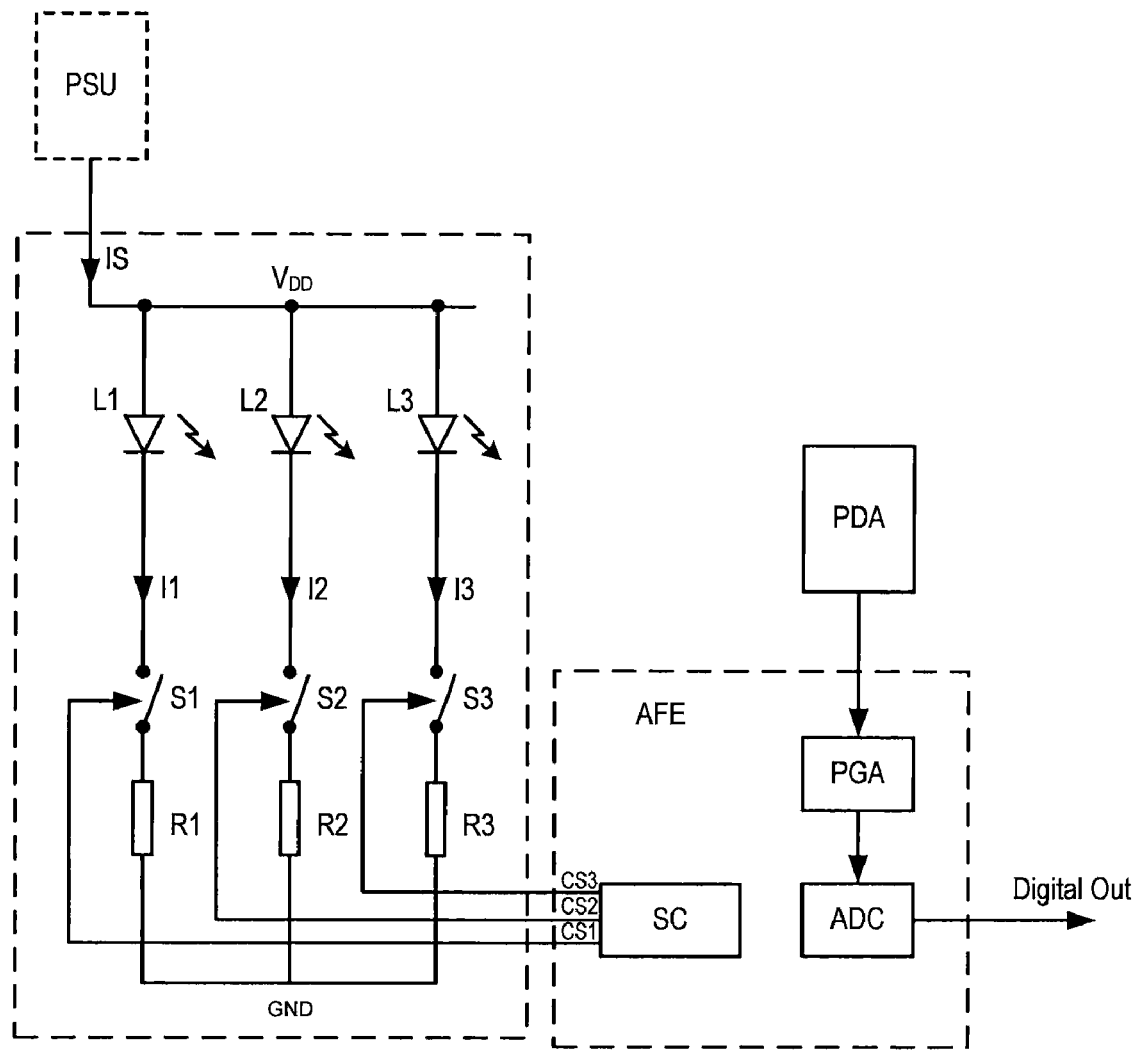
FIG. 1 shows a basic block diagram of a prior art system.

The provision of the current source IS1 enables the current flow through an LED (L1-L3) to be controlled, rather than being merely switched on and off as found with the arrangement of FIG. 1. The current through the LED is therefore defined by current source IS1, independently of the LED I-V characteristics or the supply voltage tolerance, so the LED current is as accurate as the accuracy of the current source. Adjustment of the current may be by direct adjustment of IS1 or by PWM modulation of IS1 and the switch signals.

Figure 2:
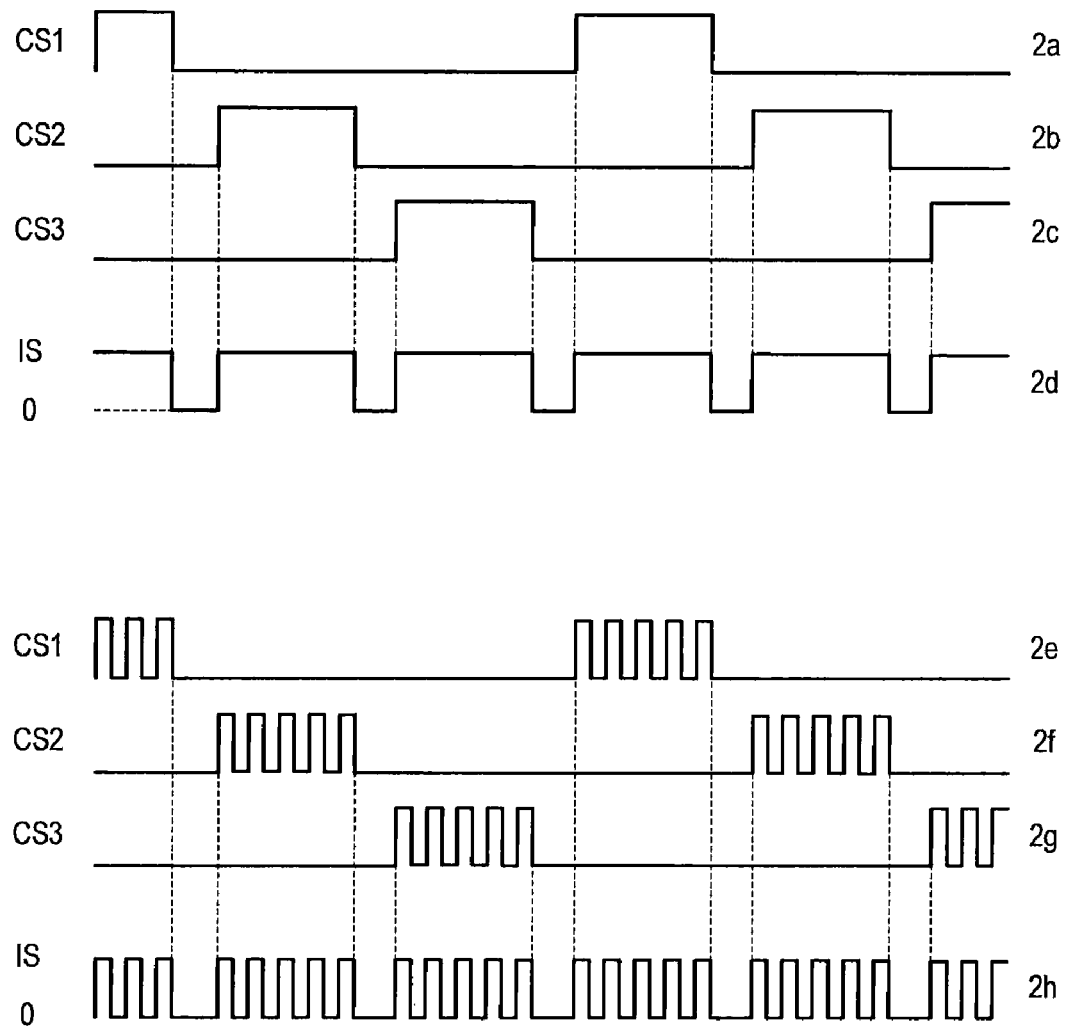
FIGS. 2a-2h show the switch control signals and the current drawn in FIG. 1 when switching between LEDs in both constant current and PWM modes.
Figure 4:
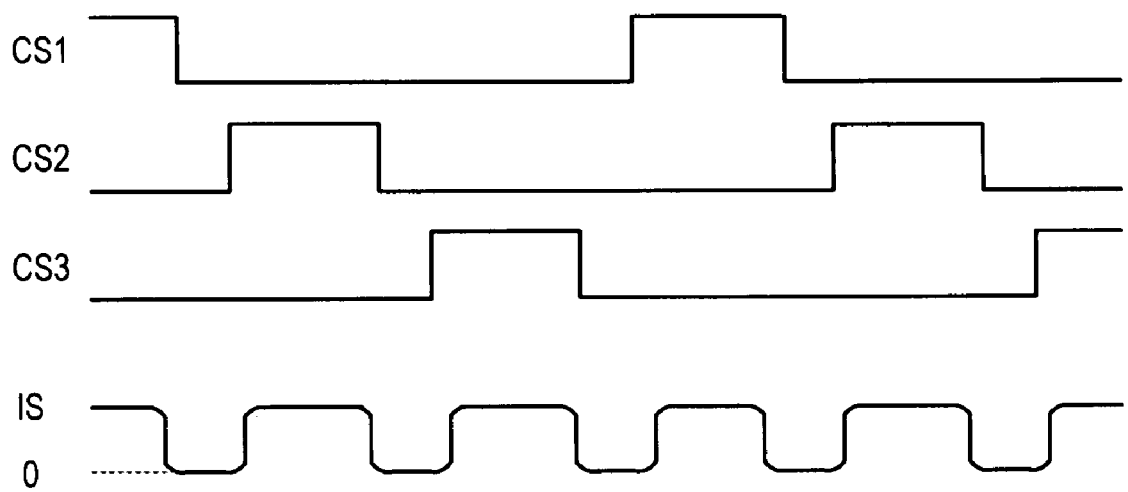
FIG. 4 shows the current drawn in the circuit of FIG. 2 when switching between LEDs.

The introduction of current source IS1 also enables the rate of change of current (di/dt) through an LED to be controlled, for example by reducing the initial rate of change of current. FIG. 4 shows the supply current IS drawn by the circuit during the operation of the embodiment of FIG. 3, when IS1 is decreased in an S-shape fashion before each switch S1, S2, or S3 is turned off, and increased in an S-shape fashion shortly after the next switch is turned on. As can be seen the current waveform IS has smoother S-shaped transitions than the current waveform IS of FIG. 2, thereby reducing unwanted transient signals. The ground return current waveform is similar. Such S-shape waveforms may be generated by known techniques.

Thus, it can be seen that in the arrangement of FIG. 3, the LED switches (S1-S3) may be integrated on the same IC as the AFE processing circuitry, with the current source IS1 being provided to reduce the generation of unwanted transient signals.

Figure 5:
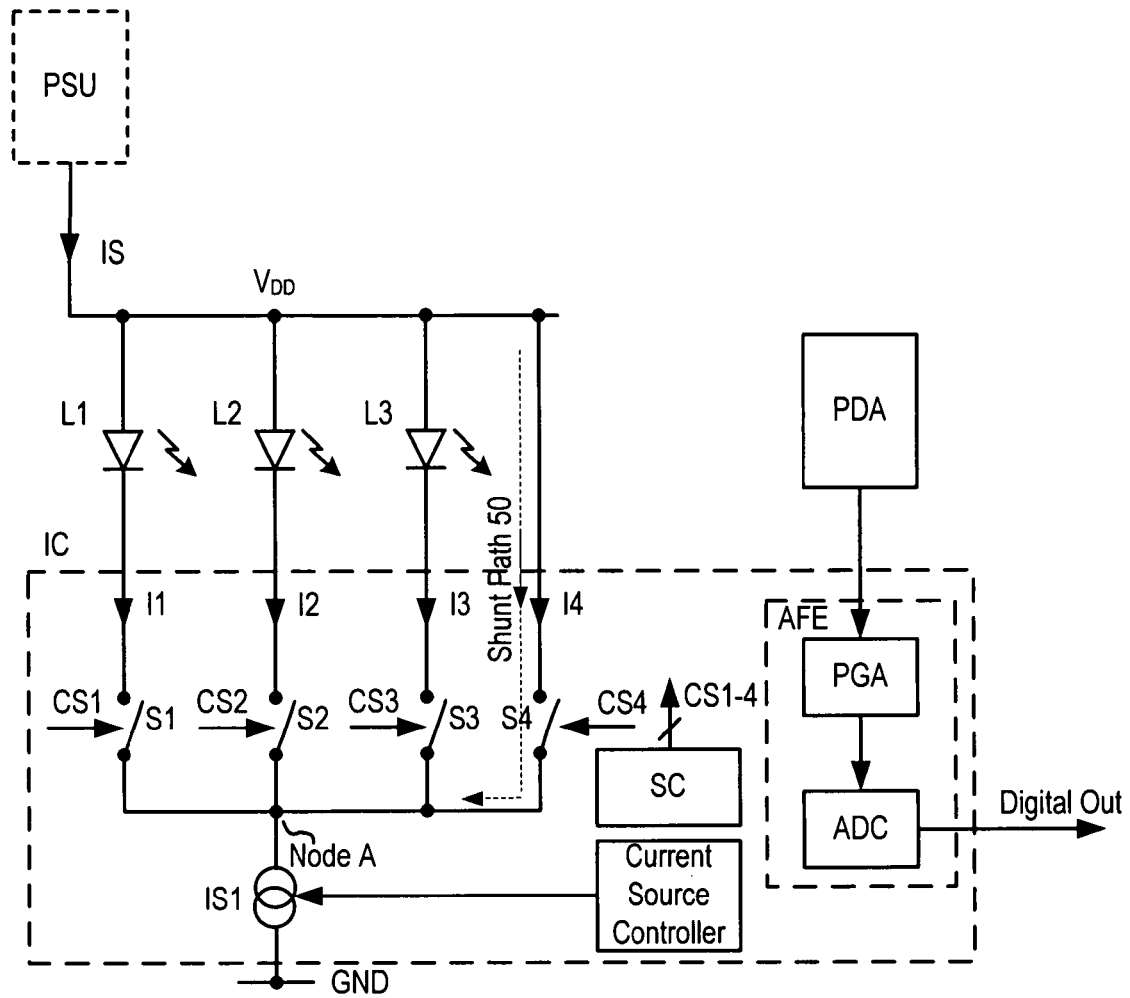
FIG. 5 shows a basic block conceptual diagram of a second arrangement for driving an LED array.

FIG. 5 shows a basic block diagram of a second arrangement for driving an LED array.

In a similar manner to FIG. 3, an LED array comprises Red, Green and Blue LEDs L1, L2, L3. The LED switching circuitry S1, S2, S3 is placed on the same monolithic circuit as the analogue front end circuitry (AFE) that drives the switching circuitry. A current source IS1 is provided in the current path between the switches S1, S2, S3 and ground, for controlling the flow of current through the LEDs L1, L2, L3.

According to this second arrangement a shunt path 50 is provided. The shunt path 50 comprises a switching device S4. The shunt path 50 having the switching device S4 is provided in parallel with the LED array and switching circuitry. The problem relating to the LED switching transients interfering with the ADC is reduced because, as will be explained below, the shunt path 50 enables harmful transitions in the ground current flow to be reduced.

The following text describes the operation of the switching device S4 in the shunt path 50 for reducing transient signals when switching from one LED to another.

The shunt path 50 is enabled when switching device S4 is switched on. S4 is switched on in sequence with the operation of the LED switches S1-S3 as will be described in the following.

Figure 6:
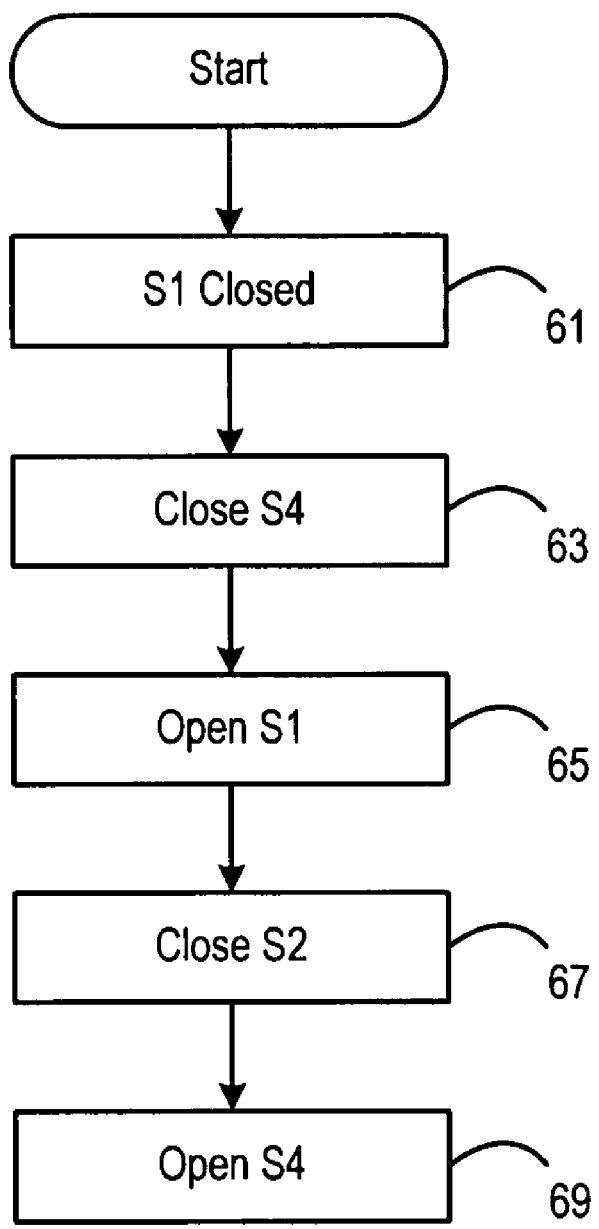
FIG. 6 shows a flow diagram relating to the switching sequence of switches S1-S4 of FIG. 5.
Figure 7:
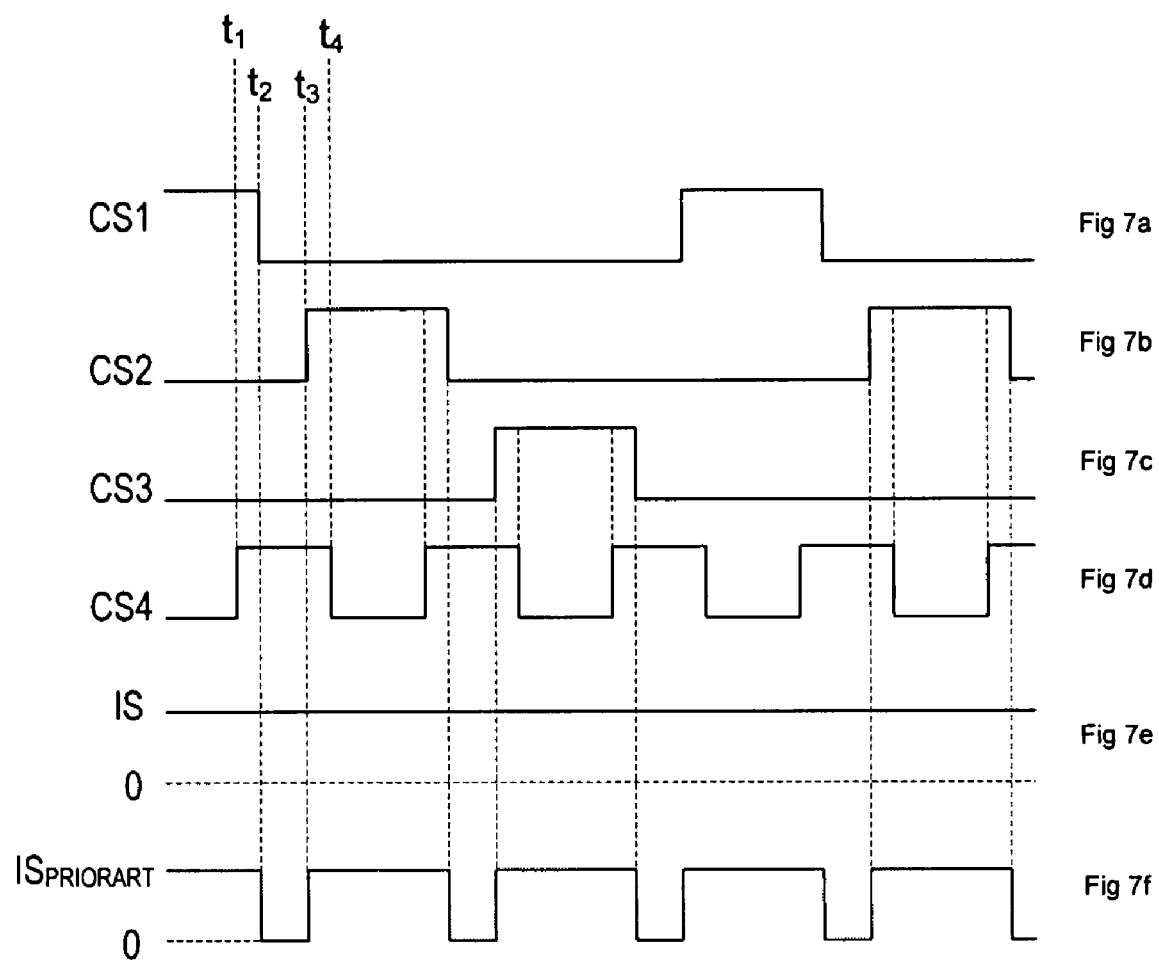
FIGS. 7a to 7f are signal diagrams illustrating the switching sequence of switches S1-S4 of FIG. 5.

Referring to the flow chart of FIG. 6, assume S1 is switched on (i.e. S1 is closed), step 61, such that LED L1 is passing a current I1 from the positive supply VDD to ground GND via current source IS1.

During operation of a scanner, for example, once L1 has achieved its task (e.g. used to illuminate the object while the red component of one line of its image is generated), L1 has to be switched off by switching off S1 (i.e. opening S1), and S2 has to be switched on (closed) so that L2 passes its current I2 (thus enabling L2 to illuminate the object while the green component of one line of its image is generated).

According to this second arrangement, prior to switching off S1, switch S4 is switched on, i.e. closed (step 63) such the Node A, on the high side of the current source IS1, is coupled to the supply voltage VDD.

Switching on S4 has the effect of applying zero bias, or at least much reduced bias, to the LED L1. In other words, S4 has the effect of steering the current away from the L1/S1 current path. The current I4 through S4 is limited by the current source IS1, so the total supply or ground current is still IS1.

Even though the LED L1 is effectively turned off, its associated switch S1 is still however closed, i.e. switched-on.

S1 can now be opened in step 65, i.e. switched-off, thereby removing the LED L1 from the circuit. The total supply or ground current is still IS1.

Switch S2 is then closed, step 67, thereby connecting LED L2 to the circuit. Switch S4 remains closed during this switching between L1 and L2.

Once switch S2 has been closed, S4 can then be switched-off in step 69, i.e. opened, thereby allowing LED L2 to become forward biased such that a current I2 passes from the positive supply VDD to ground GND via current source IS1.

This sequence is performed in a similar manner when changing from LED L2 to another LED, for example L3, and so on.

It will therefore be realised that, rather than the power supply current IS having large switching current components being drawn in a disrupted, non-continuous manner from the power supply (i.e. corresponding to the currents I1, I2 & I3 being drawn by the respective LEDs during operation), the power supply current IS remains constant instead.

The circuit arrangement of FIG. 5 therefore performs differential current switching, such that current either flows through an LED (e.g. L1/S1) and the current source IS1, or through the shunt path 50 and the current source IS1.

Thus, it will be appreciated that the circuit of FIG. 5 enables a substantially constant current IS to be drawn from the supply, and the same substantially constant current to flow in the ground return path, which reduces or substantially eliminates the ADC interference problem associated with the switching transients, such that it is possible that the ADC is capable of being integrated on the same IC as the LED switching array (S1-S3). Integrating the switches on the same IC as the processing circuitry has the effect of minimising the cost associated with such an application.

FIGS. 7a-7d provide a further illustration of the switching sequence of switches S1-S4 of FIG. 5. Prior to time $t_1$ the LED L1 of FIG. 5 is being illuminated. In other words, switch S1 is turned-on (i.e. due to the corresponding switch control signal CS1 being high), while switches S2, S3 and S4 are turned-off (i.e. due to switch control signals CS2, CS3 and CS4 being low). The following operation is then performed in order to illuminate LED L2 in place of LED L1. First, at time t, the switch S4 is turned-on (i.e. by taking the switch control signal CS4 high). This causes the shunt path 50 of FIG. 5 to become operational. Next, at time $t_2$ the LED L1 is removed from the circuit by turning off switch S1 (i.e. by taking the switch control signal CS1 low). It will be appreciated that the current IS drawn from the supply remains constant despite LED L1 being turned off, due to the effect of the shunt path 50 and current source IS1. At time $t_3$ switch S2 is turned-on (i.e. by taking switch control signal CS2 high) such that LED L2 is connected to the circuit. Finally, at time $t_4$ the shunt path is removed by turning off switch S4 (i.e. by taking the switch control signal CS4 low).

A similar procedure is performed when switching from LED L2 to LED L3, or from LED L3 to LED L1.

FIG. 7e illustrates the current IS drawn from the power supply of FIG. 5 when performing the switching operation described above. As can be seen, the current IS remains substantially constant.

In contrast, FIG. 7f illustrates what power supply current IS would be drawn from a power supply (or the corresponding ground return current) when performing a switching operation in an arrangement as shown in FIG. 1, i.e. if the shunt path 50 were absent.

Although not shown in FIGS. 7a to 7f, it will be appreciated that the arrangement of FIG. 5 can also be used in a PWM mode of operation, whereby the respective switches are controlled by altering the duty-cycle and/or frequency of their control signals, for example toggling CS4 during a time when one of S1 to S3 are on.

It should be noted that it is preferable to switch Node A in a controlled manner so that the rate of change of voltage (dv/dt) at Node A is not excessive.

Figure 8:
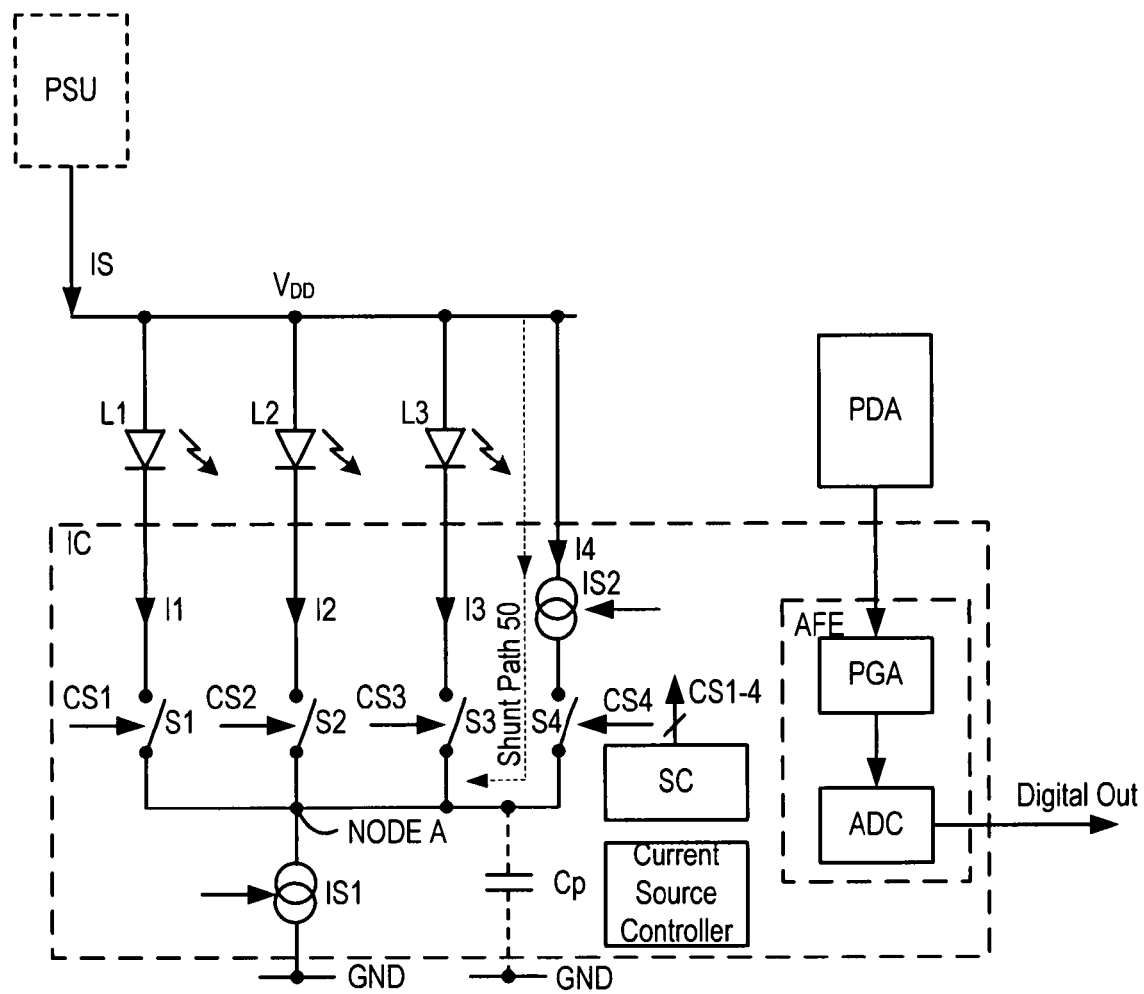
FIG. 8 shows a basic block conceptual diagram of a third arrangement for driving an LED array.
Figure 9:
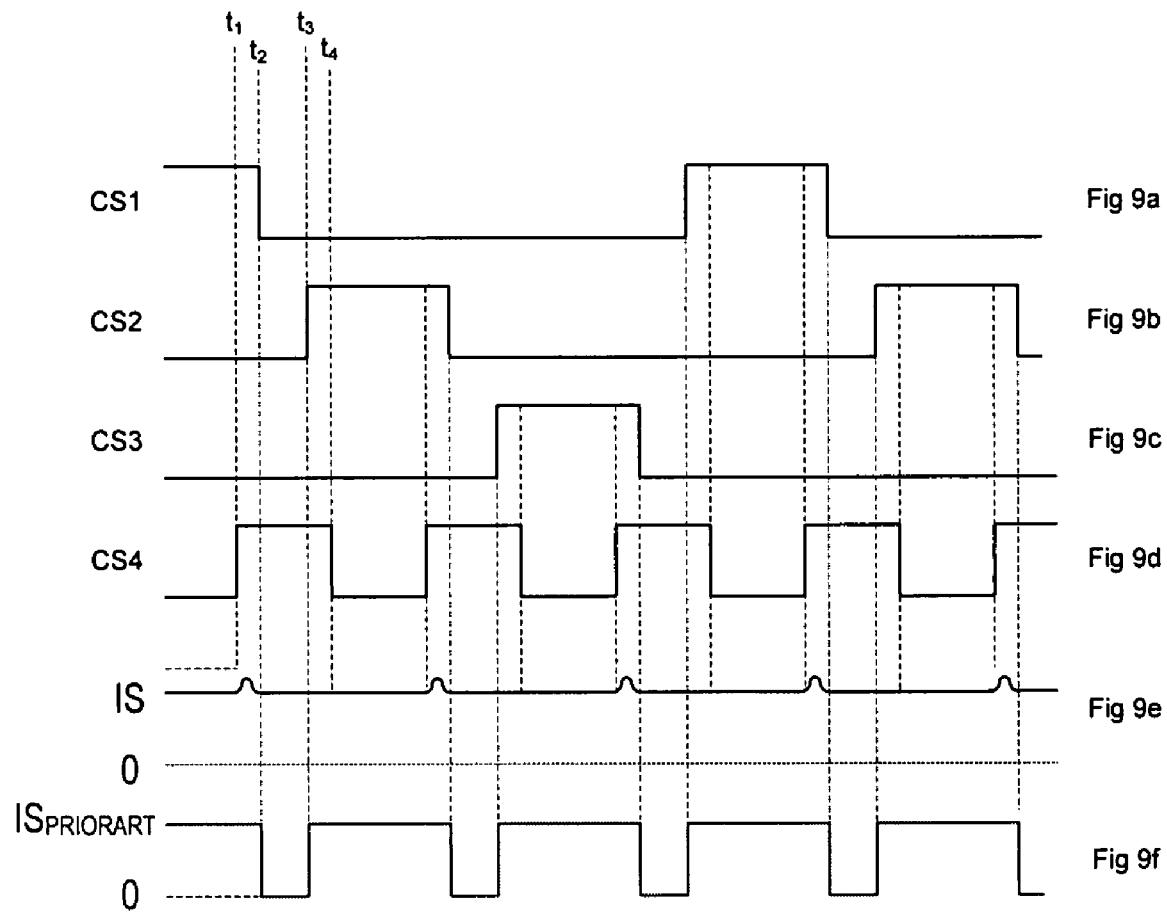
FIGS. 9a to 9f are signal diagrams illustrating the switching sequence of switches S1-S4 of FIG. 8, when switching between LEDs in constant current mode.
Figure 10:
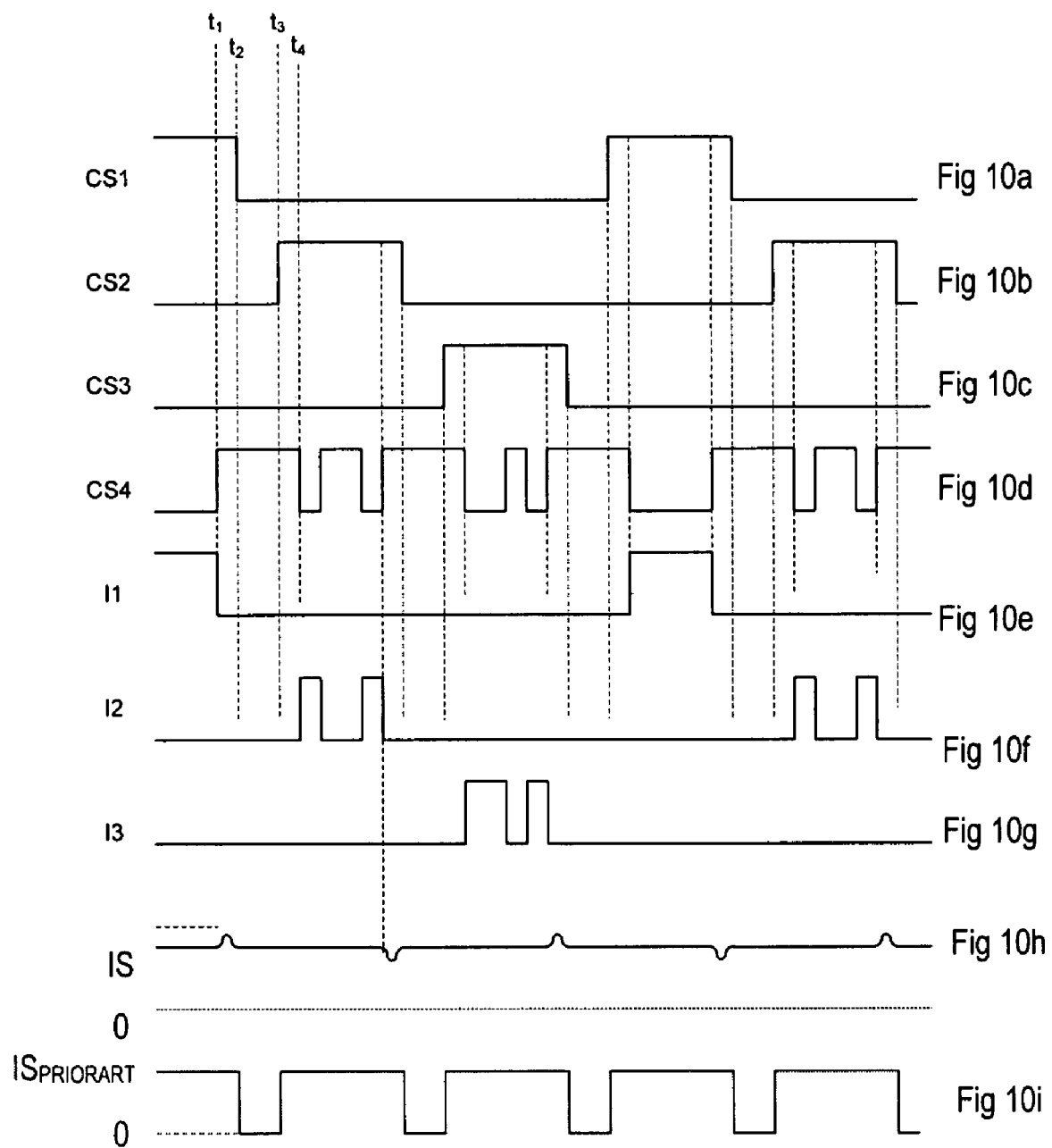
FIGS. 10a to 10i are signal diagrams illustrating the switching sequence of switches S1-S4 of FIG. 8, when switching between LEDs in PWM mode.

FIG. 8 shows a basic diagram of a third arrangement for driving an LED array.

As with FIGS. 3 and 5, an LED array comprises Red, Green and Blue LEDs L1, L2, L3. The LED switching circuitry S1, S2, S3 may form part of the same monolithic circuit as the analogue front end circuitry (AFE) that processes the image data received from the photo sensors. To reduce the problem associated with LED switching transients interfering with the ADC process, a current source IS1 is provided in the current path between the switches S1, S2, S3 and ground, for controlling the flow of current through the LEDs L1, L2, L3. A differential current path 50 (or shunt path) having a switching device S4 is provided in parallel with the array of LEDs and corresponding switches S1-S3.

In addition, according to this arrangement, a second current source IS2 is provided in the shunt path 50. The second current source IS2 enables the switching of the shunt path 50 to be performed in a more controlled manner. As will be described in greater detail below in relation to FIGS. 12a to 12d, there will be capacitance Cp associated with Node A, either parasitic capacitances or possibly an actual additional capacitor.

The second current source IS2 is switched on by switching device S4 in sequence with the LED switches S1-S3 as was described above in connection with FIGS. 5, 6 and 7. The current drawn by the second current source IS2 may be configured to be a predetermined amount greater than the current IS drawn through the LED L1, for example 5% greater. For example, it may be configured so that it can be switched between say 105% of IS1 and 95% of IS1, for example by comprising a 95% current source and a 10% current source in parallel, separately switchable.

FIGS. 9a-9d illustrate the switching sequence of switches S1-S4 of FIG. 8. Referring to FIGS. 9a-d, just before switch S1 is switched off at time $t_2$, current source IS2 is switched on via switch S4 at time t, and draws a slightly larger current IS from the supply than the current IS previously drawn by LED L1 from current source IS1. The difference in current between IS2 and IS1 serves to charge up the capacitance Cp on node A, until node A has risen to the voltage compliance limit of current source IS2 and the output current of IS2 reduces to equal IS1. In other words, a slightly larger current IS equal to IS2 is drawn for a short time after time $t_1$, as shown in FIG. 9e. The modulation of the ground return current is substantially the same as that of the supply current IS. It is noted that the difference between IS2 and IS1 flows as a displacement current though Cp while node A is changing voltage.

When switching from using one LED, for example L1, to using another LED, for example L2, as before, S1 can now be opened (switched off) at time $t_2$ so as to isolate LED L1, and S2 can be closed at time $t_3$ to connect LED L2. During this switching operation switch S4 remains closed.

Once switch S2 is closed, current source IS2 is reduced, to be less than IS1, and node A will decrease in voltage, at a rate determined by Cp and the difference between IS1 and IS2. Node A will decrease in voltage until LED L2 starts to take the difference current. Switch S4 can then be switched off at time $t_4$, i.e. opened, thereby stopping the current flow through IS2 and fully forward biasing LED L2 such that LED L2 becomes illuminated and draws current from the supply driven by current source IS1.

This sequence is repeated when switching from LED L2 to another LED.

Thus, it can be seen that, rather than the power supply having a large switching current IS being drawn from it as shown in FIG. 9f (i.e. in a disrupted or non-continuous manner corresponding to the respective LED currents I1, I2, I3), the power supply has a much smoother or continuous current IS drawn from it (as shown in FIG. 9e). The ground current will be equal to the constant current source IS1 plus any brief transient currents charging Cp, so in this case the ground current will be IS1 plus or minus 5%, for example. The supply current modulation will be the same. In contrast, FIG. 9f illustrates what current $IS_{PRIOR\ ART}$ would be drawn in a prior art arrangement as shown in FIG. 1, i.e. if IS2 and S4 were absent. As shown in FIG. 9f, the current $IS_{PRIOR\ ART}$ drawn from the supply would switch between $IS_{PRIOR\ ART}$ and zero when switching from one LED to another.

The smaller switching current of the invention minimises the effect of switching transients such that the ADC is capable of being integrated on the same IC as the LED switching array and the IC can be placed on the scanner head. Such an integrated scheme has the effect of minimising the cost associated with such an application.

According to a further arrangement, the switches in the embodiment of FIG. 8 can be controlled using pulse width modulation (PWM) control signals. This could be achieved by toggling CS1 etc, but to reduce supply and ground current ripple, CS4 would need to be toggled in anti-phase. However, it is preferable to apply PWM to the shunt path. In other words, while switch S2 say is closed, switch S4 is controlled using a PWM control signal, thereby indirectly controlling the current I2 passing through LED L2 and therefore the average intensity of LED L2. FIGS. 10a to 10i show a PWM operation where L1 is run at 100% duty cycle, L2 at a small duty cycle and L3 at an intermediate duty cycle.

According to a further embodiment, to allow variation of the LED currents without PWM switching, the current source IS1 (and IS2) can be varied in magnitude, by a common amount for all LEDs or differently for each LED. In other words, the current sources IS1 and IS2 can be fixed (i.e. set to operate in a predetermined mode of operation), or programmable, such that the operation of the current source is variable. Further discussion of this aspect of the invention will be provided after discussing the features of the current source IS1 and the current source IS2 in greater detail.

Figure 11A:
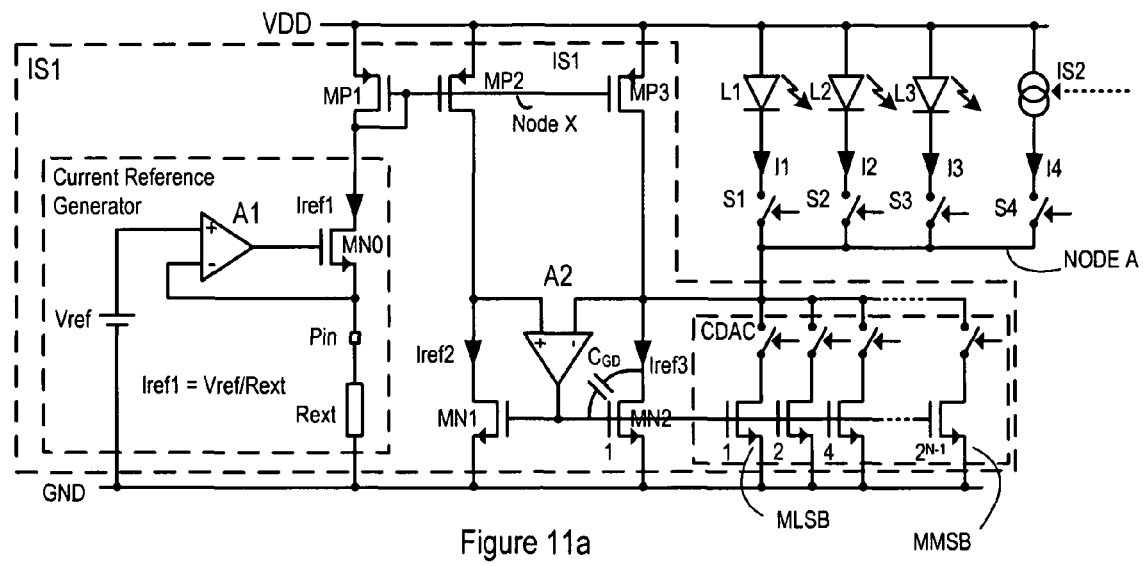
FIG. 11a provides a more detailed illustration of FIG. 8, and in particular of the first current source IS1.

FIG. 11a illustrates a more detailed example of a current source IS1 that may be used in the arrangements of FIGS. 3, 5 and 8.

Referring to FIG. 11a, a Current Reference Generator (CRG) basically sets the reference current Iref1 for the whole circuit.

A reference voltage Vref supplied to an input of an amplifier in the CRG is preferably a bandgap reference voltage, thus being very accurate and stable.

In this particular example of the CRG, Vref is applied to the input of amplifier A1. Feedback around amplifier A1 and transistor MN0 forces the voltage on node Pin to equal Vref, and thus sets the current through the resistor Rext. This current passes through MN0 to give the output current Iref1, equal to Vref/Rext.

"Pin" may represent an output pin on an IC. This allows a user to set the reference current Iref1 to a desired value by altering the value of an external resistor, Rext. The ability of a user to set Iref1 is preferable, since it relates to the type of LEDs (L1-L3) that are used, with different LEDs having different characteristics. Alternatively Rext may be integrated with A1, possibly trimmable or digitally programmable to allow adjustment.

Current Source IS1 comprises a series of controlled current sources MP2/MP3 that define the currents Iref2 and Iref3 that are mirrored versions of Iref1.

Current source IS1 comprises a variable current source, for example, a Current Digital-to-Analogue Converter (CDAC), which is made up of a series of $2^{N-1}$ NMOS transistor and switch arrangements: where N is an integer greater than 1. It should be noted that Iref2 & Iref3 set up the current sinking capabilities of the CDAC as will be described below.

Within the CDAC, each individual switch is controlled so as to allow its associated NMOS transistor to connect to node A, the low-side of switches S1-S4. It should be noted that the CDAC NMOS transistors MLSB, . . . , MMSB have W/L ratios that are binary-weighted such that the each successive transistor, when switched on, is capable of sinking twice as much current as its predecessor. This is denoted by the labels 1, 2, . . . $2^{N-1}$ close to each transistor MLSB, . . . , MMSB. Such an arrangement allows the current sunk by the CDAC to be accurately controlled over a wide range of current values.

As mentioned above, in operation the Red, Green and Blue LEDs L1-L3 may require different current values to pass through them. This is in part due to the different characteristics of the LEDs, and also in part due to the required brightness of each LED during a scanning operation. The brighter the LED is made the less the sampling (i.e. integration), and hence scanning, time is required which means that the scanner can operate quicker. Therefore, it is desirable to operate the LEDs at or near their maximum current ratings without damaging the LEDs.

In the circuit of FIG. 11a, the current Iref2 through MN1 is mirrored by MN2 and MLSB, . . . , MMSB. To maintain accuracy despite variation in the voltage of node A, amplifier A2 is introduced. The voltage on the inverting input of the A2 is that of node A and varies during operation. Negative feedback from the non-inverting input of A2 via the voltage inversion and gain introduced by MN1 causes the gate voltage of MN1 to settle out to that voltage necessary to sink the current Iref2 output from MP2. MN2 and MP3 are not essential, but are introduced to maintain feedback in the case where all the CDAC NMOS transistors (MLSB-MMSB) are turned off (i.e. zero output current).

Modern electronic systems, and scanners in particular, now operate at low supply voltages to reduce power consumption, power dissipation, and active and passive component cost. For low voltage applications, such as where VDD=5v, the current source IS1 is therefore selected and designed such that the maximum possible voltage drop exists across the LEDs L1-L3, while the minimum possible voltage drop exists across the current source IS1.

Assuming the CDAC comprises 8 bits (N=8), there are then 256 discrete levels (since $2^8$=256) from zero to Imax3 in 255 steps, so each step ($I_{LSB}$) is Imax3/255, where Imax3 is the maximum output current of the CDAC.

Assume that the maximum desired current through any one of the LEDs is Imax1 (allowing for tolerances in the LEDs). Then, allowing some margin, Imax3<Imax1.

IS2, for correct operation, is configured to be capable of sourcing a current Imax2 that is slightly greater, for reasons which will be apparent from the following description, than Imax3, such that:

Imax2>Imax3

It is preferable to set the W/L ratio of MN1 to be the same as that associated with the LSB NMOS transistor of the CDAC (as indicated by the number "1" just below the gate terminal). Therefore, MN1 sinks a current Iref2 that equals Imax3/255 which equals $I_{LSB}$. It should be noted that Iref2 can be scaled such that it is larger or smaller than Iref1, and this can be achieved by the sizing of the transistor W/L ratios of transistors MP2 relative to transistor MP1. Also Iref2 can be scaled with respect to Imax3 by sizing MN1 relative to the CDAC NMOS transistors MLSB, . . . , MMSB.

Transistor MN2 is illustrated as having a parasitic Gate-Drain capacitance CGD. Such a capacitance exists in all of the NMOS transistors of the CDAC although they are not illustrated: such a parasitic capacitance is referred to as a Miller capacitance.

It should be noted that it is the combined Gate-Drain capacitance $C_{GDTOT}$ of all these capacitances (for MN2 and those NMOS transistors switched on in the CDAC and possibly input transistors of A2) that provides one mechanism for exacerbating the supply and ground current transients referred to earlier, giving rise to the requirement to render small the slew rates of node A as mentioned above in relation to FIG. 5.

Referring to FIG. 5, the effect $C_{GDTOT}$ has in the arrangement of FIG. 5 is that as the shunt path is enabled, i.e. as S4 switches-on, and connects the supply voltage VDD to the high sides of MN2 and the enabled CDAC NMOS transistors, there is a large dv/dt on node A. This is a.c. coupled through $C_{GDTOT}$ onto the gates of these transistors causing a spike in their currents, and these currents manifest as transients on the supply rails which will have an effect, to a greater or lesser effect depending on the value of $C_{GDTOT}$, on the ADC.

A second effect, for example when using a current source IS1 as shown in FIG. 11a, is that the transient kick on the gates of MN2 and the other parallel NMOS transistors MLSB, . . . , MMSB disturbs the bias point set by amplifier A2. A2 will have only a finite bandwidth, so may take some time to settle out and re-establish the steady-state bias point. During this time the current output from the CDAC will deviate from the nominal. Hence, there is the need to control the slew rate of the voltage at Node A.

It should be noted that S4 illustrated in FIG. 5 may be, in a very basic version of the invention, implemented as a variable resistor, resistive controlled switch etc., such that it is switched on in a controlled manner so as to avoid these high rates of change of voltage dv/dt on Node A. Similarly for IS2 in the arrangement of FIG. 8.

Due to the requirement of having the maximum possible voltage drop across the LEDs, and the minimum voltage drop across the current source IS1, the circuit of FIG. 11a is susceptible to damage due to the high voltage at Node A of FIG. 5. This is because the high voltage of Node A causes the voltage on the gate of MN2 to rise due to Miller Capacitance effects, thus causing MN2 to turn on.

Figure 11B:
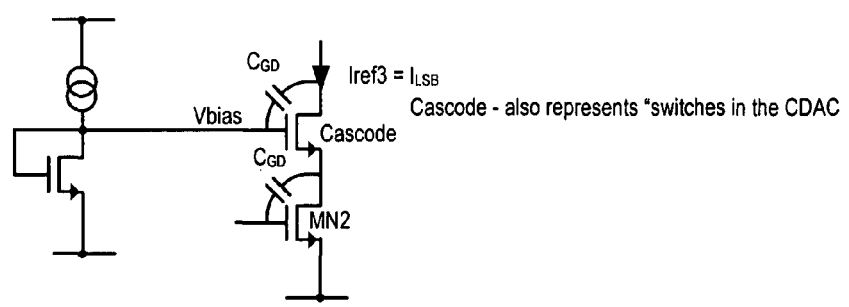

In view of this possibility, FIG. 11b shows an improvement in which a cascode transistor is connected to the drain of MN2, thereby shielding MN2 from the voltage at Node A in FIG. 5. The cascode transistor is biased by a reference voltage Vbias that may, for example, be supplied by a current source arrangement as shown.

The cascode transistor illustrated in FIG. 11b and associated with MN2 is preferably used as the basis for the respective switches associated with each of the CDAC NMOS transistors (not illustrated). Each "cascode" switch in the CDAC is controlled independently by a control signal that biases its respective cascode switch. The advantage of utilising the cascode switches in the CDAC is that it helps to isolate the CDAC and the ground supply rail from transients.

As mentioned above, in low voltage applications, it is preferable to have the maximum possible voltage drop across each of the LEDs so as to maximise the current through the LEDs, which implies the minimum possible voltage drop across each of the switches S1-S3 and the current source IS1. It is noted that the on-resistance of the switches is substantially negligible hence the voltage drop is low in comparison to that associated with the current source IS1.

In order to minimise the voltage drop across current source IS1, there needs to be a low Drain-Source voltage drop across MN1 and as well as MN2 and the CDAC transistor and switch elements. However, to keep MN2 in its saturation region, thereby providing a good current source, the $V_{DSsat}$ of these transistors must be kept low.

The transconductance (gm) of an NMOS transistor is given approximately by:

$$gm=2.IDS/V_{DSsat}$$

Therefore, gm is inversely proportional to $V_{DSsat}$ and is therefore high for a low $V_{DSsat}$.

Any mismatch in transistors MN1 & MN2 will result in an effective offset voltage at the gate terminal of MN2. Such an offset will, because of the high gain (gm) of MN2, result in errors. From the above formula, an effective gate voltage offset ΔV will give a fractional error ΔI in output current Iref3 compared to Iref2 where $$\Delta I/IDS = gm \cdot \Delta V/IDS = 2 \cdot \Delta V/V_{DSsat}$$

This is especially true when the transistors within the CDAC are switched in as they too have high transconductances like MN2 plus, they are binary-weighted and driven by the effective offset voltages of similar magnitude.

To achieve say 8-bit accuracy for say a 100 mV VDSsat of MN1 requires sub-millivolt offsets. The random manufacturing offset voltage of a MOS transistor may be reduced by increasing its gate area. But since the offset is only inversely proportional to the square root of its gate area: this leads to impractically large devices for MN1 and the CDAC devices. To overcome this, there may be provided a second, more accurate, current source, whereby the output of the first current source is calibrated against this second current source. In this arrangement, IS2 comprises this second current source. IS2 has much more headroom, almost all of VDD, so can include devices with much greater $V_{DSsat}$ and hence much smaller area for the required accuracy.

Figure 12A:
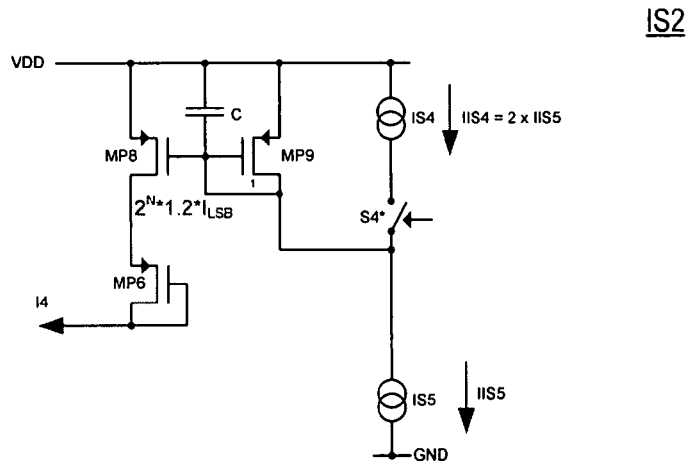
FIG. 12(a) illustrates a simplified example of the current source IS2 used in FIG. 8.
Figure 12B:
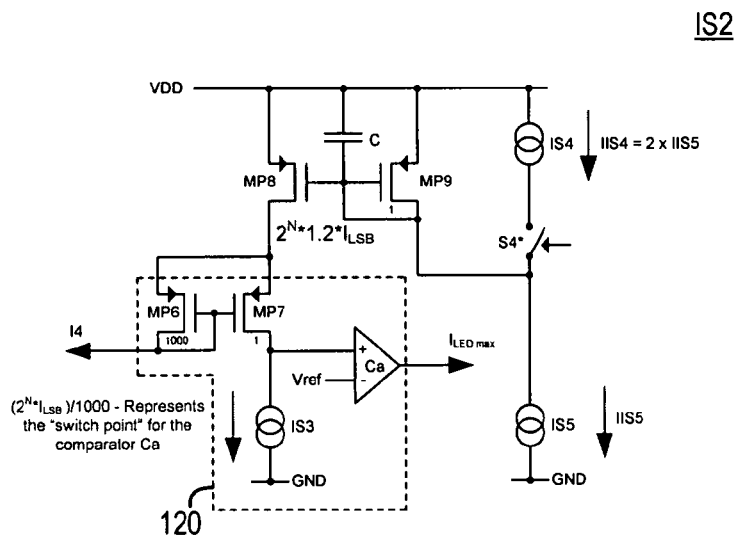
FIG. 12(b) illustrates an embodiment of an implementation of a protection circuit according to the present invention.
Figure 12C:
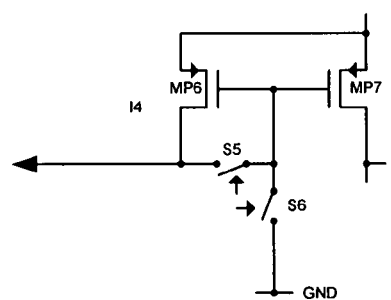
FIG. 12(c) illustrates how the protection circuit of FIG. 12(b) can be switched off; and, FIG. 12(d) illustrates a more detailed example of the current source IS2 described in FIGS. 8 and 12(a).
Figure 12D:
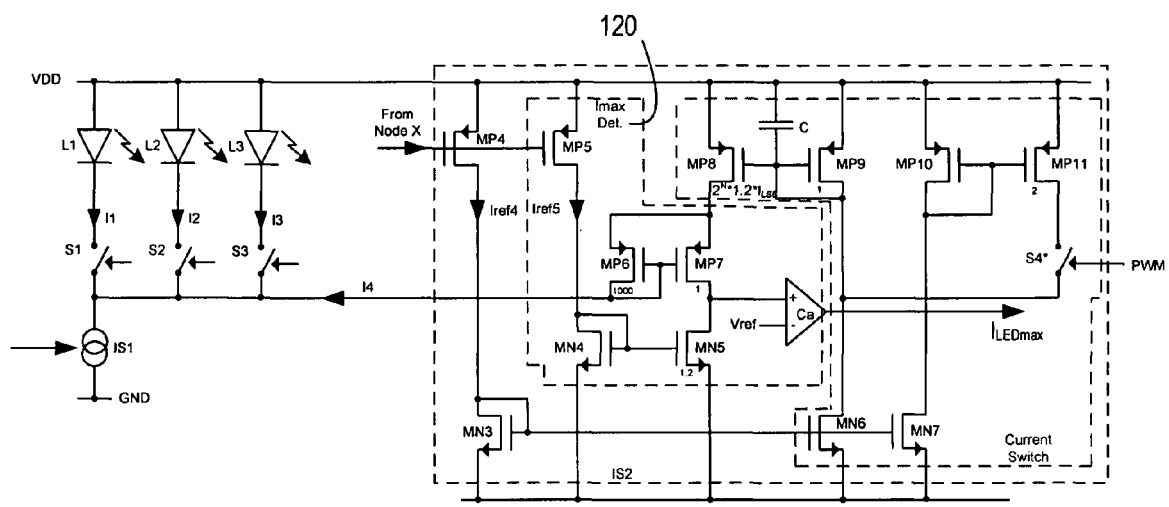

To provide a more detailed explanation of the current source IS2, reference will now be made to FIGS. 12a to 12d in which:

FIG. 12a illustrates a simplified example of the current source IS2 used in FIG. 8, FIG. 12b illustrates an implementation of a protection circuit for detecting a maximum current (Imax) according to the present invention, FIG. 12c illustrates how the protection circuit of FIG. 12b can be disabled, and FIG. 12d illustrates a more detailed example of the current source IS2 described in FIGS. 8 and 12a.

Referring to FIGS. 12b and 12d, and explanation will now be given concerning how the shunt path 50 comprises a protection circuit 120 for preventing an over current from passing through an LED L1-L3. In FIG. 12d: transistors MP5, MN4 and MN5 constitute the current source IS3 in FIG. 12b; transistors MP4, MN3 and MN6 constitute the current source IS5 in FIG. 12b; and transistors MP10, MP11 and MN7 constitute the current source IS4 in FIG. 12b.

Referring to FIG. 12d, transistor MP4 is driven from a suitable voltage, for example Node X of FIG. 11a, to deliver a current Iref4, another replica of Iref1. This is mirrored by transistors MN3 and MN6 and then mirrored again by transistors MP9 and MP8. Most of MP8's output current is then output via MP6 of the protection circuit 120 to provide an output current I4 to deliver the current Imax2 when the LEDs are shunted by current source IS2.

MP7 of the protection circuit 120 mirrors the current Imax 2 flowing through transistor MP6. The W/L ratio of MP7 may be, for example, 1/1000 of that of MP6. This means that the protection circuit 120 diverts only a small fraction of MP8's output current, and only consumes minimal power when performing its current detection function.

MP5 is driven with the same gate voltage as MP4 to give another replica current Iref5, which is then mirrored via MN4 and MN5. MN5 is connected to MP7: the voltage at their common drain node will go high if MP7 carries more current than MN5 and low if MP7 carries less current than MN5. Since I(MP7) is a known fraction (say 1/1000) of I(MP8), this flags whether I(MP8) is less than or greater than some predetermined threshold, this predetermined threshold being determined mainly by the transistor size ratios of mirrors MP6: MP7, MN5:MN4, and the ratio of MP4, MP5 to say MP1 of FIG. 11a.

The comparator Ca compares the voltage at this common drain node of transistors MP7 and MN5 with a reference voltage Vref. Thus if the maximum current flowing through MP8 exceeds the predetermined threshold then the comparator output signal $I_{LEDmax}$ is set so as to indicate this condition.

In operation, the output of MP6 is connected to the output of IS1 as shown and conducts the current I4. If IS1 is less than I4 (i.e. IMP6) then node A will rise, until the source voltage of MP6, i.e. the drain voltage of MP8 has risen enough to take MP8 out of saturation into triode operation, i.e. past the output voltage compliance of MP8 regarded as a current source. MP7 will still output the same fraction of I4 (IMP6), so the comparator flags whether I(IS1) is less than or greater than the predetermined threshold of I4 (IMP6).

If however IS1 is greater than I4 (IMP6) then node A will fall until node A reaches the voltage compliance of IS1 when delivering I4 defined by MP8. The current through MP7 will then be high, so the comparator Ca will flag this. This "flag" signal $I_{LEDmax}$ can then be used to inhibit the turn-on of switches S1, ..., S3 to prevent the IS1 current being steered to the LEDs, at least until the digital control to IS1 CDAC has been adjusted to decrease to a desired safe level, thereby protecting the LED.

Thus, according to the invention, the protection circuit 120 enables the LEDs to be illuminated at their maximum intensity, while preventing an over-current from flowing through any of the LEDs L1-L3.

In this implementation of IS2, its output current I4 is switched on and off by controlling the gate of MP8 using a switch S4*. (Note that S4* open corresponds to S4 being closed in previous diagrams, and vice versa.)

As discussed above, it is desirable to limit the voltage slew rate on node A. This is implemented with the aid of capacitor C and controlled charging currents from MN6 and MP11. Referring to FIG. 12b, it should be noted that the current IIS4 sourced by current source IS4 (MP11) is twice that of the current IIS5 sourced by current source IS5 (MN6) such that: when S4* is open, current source IS5 is sinking a current which pulls the gates of transistors MP8 and MP9, as well as the low-side of capacitor C towards ground. Transistors MP8 and MP9 turn on, at a rate influenced by the capacitor C, and MP8 mirrors a magnified version of the current flowing through transistor MP9. When S4* is closed current source IS4 effectively pulls the gates of transistors MP8 and MP9, as well as the low-side of capacitor C towards the supply VDD and transistors MP8 and MP9 turn off, at a rate influenced by the capacitor C, thereby gradually stopping the current (I4) flowing to current source IS1.

The capacitor C, which is a relatively large capacitor, connected between the common gate terminals of transistors MP8 and MP9 acts to delay the rise in the gate voltages of transistors MP8 and MP9 such that rather than these two transistors turning hard on in a relatively short period, the turn-on time of these transistors is relatively slower. This has the effect of reducing the rate of change of voltage dv/dt at Node A. It will be appreciated that the sizes of transistors employed and the value of the capacitor, together with the LED current values can be altered so as to produce the desired effect, i.e. a reduced dv/dt at Node A, accordingly.

Referring to FIG. 12(c), it is preferable to insert a switching mechanism, as illustrated by switches S5 and S6 into the protection circuit 120 (Imax Det.). By inserting these switches, the current that initially flows through the LED is indicative of the current flowing through the LED for the duration that it is conducting current such that the LED current monitoring can be disabled. S5 and S6 are driven by inverse signals such that when S5 is closed, S6 is open and vice-versa.

From the above it can be seen that the arrangement of the preferred current source shown in FIGS. 12b, 12c and 12d allows the current set for each of the LEDs to be measured: if it exceeds a maximum then the LED is not connected, so the LED is protected. This is active whenever the shunt current path is enabled, either when switching between LEDs or in the "off" time between pulses in PWM mode. This has the advantage of enabling the current to be monitored and controlled in the shunt path, rather than in the path actually containing an LED.

It should be noted that the W/L ratio of MP8 may be scaled if desired. For instance W/L for MP8 may be scaled to be $2^N*1.2$ times (i.e. for an 8 bit=256*1.2 times) that of MP9, to give a nominal IS2 scaled by 1.2 over IS1. Similarly W/L of say MN5 may be scaled to adjust the limit threshold.

In a further embodiment, rather than MP8 being a fixed size, it can be broken into a number, say 256 segments, and controlled digitally to act as a current DAC. Since it has more available headroom, it can be physically small. With MP8 CDAC set to the desired current, IS1 can be iterated until it is within an LSB of I(MP8) (strictly I(MP6)). In this way the accuracy requirements and hence the physical size of the CDAC in IS1 can be kept within reasonable limits.

It will be appreciated that the embodiments described above offer the choice of PWM or absolute control of the LED current control. To control the brightness of illumination and so the imaging period, two techniques are therefore available, i.e. adjusting the absolute current or varying the on-time of a PWM control.

The protection circuit 120 for detecting a maximum LED current, enables scan time to be minimised, by maximising LED brightness. This is achieved by running the LED near it maximum current rating. To prevent damage to the LED, the LED current is checked to be within the maximum current rating of the LED, prior to connecting the LED to the power supply.

It is noted that, in the description of the above mentioned arrangements, it is assumed in FIG. 9e, for example, that LED L2 and LED L3 draw the same current as LED1, i.e. I1=I2=I3. It will be appreciated however that, in practice, the optimum operational current of each LED might be different. Also the operational currents may be required to be adjustable, perhaps to adjust the illumination of the object to match the sensitivity of a particular sensor or reflectance of the object.

It will also be appreciated that the current source IS1 in each of the arrangements can be configured to provide a predetermined current profile, and/or configured such that the current profile is variable (for example depending upon which of the LEDs L1-L3 is being switched). In other words, the current source IS1 can be fixed (i.e. set to operate in a predetermined mode of operation), or programmable, such that the operation of the current source is variable.

It will also be appreciated that, while the preferred embodiment of the invention relates to providing a protection circuit when switching between LEDs in an LED array, the invention is equally applicable to providing a protection circuit for a single LED or light source, such that the single LED or light source is not damaged by an over-current.

It should be noted that the above-mentioned embodiments illustrate rather than limit the invention, and that those skilled in the art will be able to design many alternative embodiments without departing from the scope of the appended claims or drawings. The word "comprising" does not exclude the presence of elements or steps other than those listed in a claim, "a" or "an" does not exclude a plurality, and a single element or other unit may fulfil the functions of several units recited in the claims. Any reference signs in the claims shall not be construed so as to limit their scope.

What is claimed is:

1. A protection circuit for protecting a light source, the protection circuit comprising:
   a shunt path, the shunt path being selectively coupled in parallel with the light source;
   a detection circuit provided in the shunt path for determining the amount of current that will flow in the light source, prior to the light source being illuminated by a power supply; and
   a comparator for preventing or limiting the flow of current through the light source when the detection circuit determines that the amount of current will exceed a predetermined threshold.

2. A protection circuit as claimed in claim 1, wherein the shunt path comprises a current source having a first transistor device for controlling the flow of current through the shunt path when the shunt path is coupled in parallel to the light source, the amount of current through the shunt path being indicative of the amount of current that will flow through the light source when the shunt path is removed from being coupled in parallel with the light source.

3. A protection circuit as claimed in claim 2, wherein the detection circuit comprises a second transistor device, the second transistor device connected as a current mirror for monitoring a fraction of the current flowing through the first transistor device.

4. A protection circuit as claimed in claim 3, wherein the comparator comprises:
   a first input terminal coupled to the second transistor device;
   a second input terminal coupled to a reference voltage; and
   an output terminal for providing an output signal for preventing or limiting the flow of current when the voltage on the first terminal exceeds the voltage on the second terminal.

5. A protection circuit as claimed in claim 3, wherein the W/L ratio of the second transistor device is a predetermined fraction of the W/L ratio of the first transistor device.

6. A protection circuit as claimed in claim 5, wherein the W/L ratio of the second transistor device is $1/1000^{th}$ of the W/L ratio of the first transistor device.

7. A protection circuit as claimed in claim 1, wherein the protection circuit is operational whenever the shunt path is coupled in parallel with the light source.

8. A protection circuit as claimed in claim 1, further comprising switching means for selectively operating the protection circuit when the shunt path is connected in parallel with the light source.

9. A protection circuit as claimed in claim 1, wherein the coupling of the shunt path in parallel with the light source causes the current to temporarily stop flowing through the light source, and pass through the shunt path instead, thereby enabling the current to be monitored in the shunt path.

10. A protection circuit as claimed in claim 9, wherein the light source forms part of a driver apparatus for controlling a light source array comprising at least first and second light sources, and wherein the shunt path is connected in parallel with the light source array when switching from one light source to another light source.

11. A protection circuit as claimed in claim 10, wherein the shunt path is controlled to be coupled in parallel to the light source array prior to switching from one light source to another light source, and wherein the shunt path is controlled to be disconnected after the switching array has completed switching from the first light source to the second light source.

12. A protection circuit as claimed in claim 9, wherein the shunt path is selectively coupled in parallel with the light source array for providing a PWM mode of operation for controlling the intensity of a light source, with the current being monitored while the shunt path is coupled in parallel.

13. An electronic device comprising a protection circuit as claimed in claim 1.

14. An image reading device comprising a protection circuit as claimed in claim 1.

15. A scanning device comprising a protection circuit as claimed in claim 1.

16. A method of protecting a light source from over-current, the method comprising the steps of:
    selectively coupling a shunt path in parallel with the light source, such that current is diverted away from the light source and through the shunt path;
    detecting the amount of current flowing in the shunt path; and
    determining whether the amount of current flowing in the shunt path exceeds a predetermined threshold and, if so, preventing or limiting the flow of current in the light source when the shunt path is disconnected from being in parallel with the light source.

17. A method as claimed in claim 16, wherein the step of detecting the amount of current flowing n the shunt path comprises the step of providing a current source in the shunt path, the current source having a first transistor device for controlling the flow of current flowing through the shunt path when the shunt path is coupled in parallel to the light source, the amount of current flowing through the shunt path being indicative of the amount of current that will flow through the light source when the shunt path is removed from being coupled in parallel with the light source.

18. A method as claimed in claim 17, wherein the step of detecting comprises the step of providing a second transistor device, the second transistor device connected as a current mirror for monitoring a fraction of the current flowing through the first transistor device.

19. A method as claimed in claim 18, wherein the determining step comprises the step of comparing the fraction of the current flowing through the second transistor device with a voltage reference, and providing an output signal for preventing or limiting the flow of current through the light source.

20. A method as claimed in claim 18, wherein the W/L ratio of the second transistor device is a predetermined fraction of the W/L ratio of the first transistor device.

21. A method as claimed in claim 20, wherein the W/L ratio of the second transistor device is set at $1/1000^{th}$ of the W/L ratio of the first transistor device.

22. A method as claimed in claim 16, wherein the method of protecting the light source by a protection circuit is operational whenever the shunt path is coupled in parallel with the light source.

23. A method as claimed in claim 16, further comprising the step of selectively operating a protection circuit when the shunt path is coupled in parallel with the light source.

24. A method as claimed in claim 16, wherein the coupling of the shunt path in parallel with the light source causes the current to temporary stop flowing through the light source, and pass through the shunt path instead, thereby enabling the current to be monitored in the shunt path.

25. A method as claimed in claim 24, wherein the light source forms part of a driver apparatus for controlling a light source array comprising at least first and second light sources, and further comprising the step of coupling the shunt path in parallel with the light source array when switching from one light source to another light source.

26. A method as claimed in claim 25, further comprising the step of coupling the shunt path in parallel to the light source array prior to switching from one light source to another light source, and disconnecting the shunt path after the switching array has completed switching from the first light source to the second light source.

27. A method as claimed in claim 16, wherein the shunt path is selectively coupled in parallel with the light source array for providing a PWM mode of operation for controlling the intensity of a light source, with the current being monitored while the shunt path is coupled in parallel.

* * * * *